United States Patent
Dulkin et al.

(10) Patent No.: US 9,560,067 B2
(45) Date of Patent: *Jan. 31, 2017

(54) CORRELATION BASED SECURITY RISK IDENTIFICATION

(71) Applicant: Cyber-Ark Software Ltd., Petach-Tikva (IL)

(72) Inventors: Andrey Dulkin, Herzlia (IL); Denis Kamanovsky, Ramat-Gan (IL); Yoel Eilat, Tel-Aviv (IL); Yair Sade, Herzlia (IL)

(73) Assignee: Cyber-Ark Software Ltd., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/177,367

(22) Filed: Jun. 9, 2016

(65) Prior Publication Data

US 2016/0294863 A1    Oct. 6, 2016

Related U.S. Application Data

(63) Continuation of application No. 14/825,226, filed on Aug. 13, 2015, now Pat. No. 9,386,044, which is a continuation of application No. 14/092,991, filed on Nov. 28, 2013, now Pat. No. 9,185,136.

(51) Int. Cl.
*H04L 29/06*    (2006.01)

(52) U.S. Cl.
CPC ......... *H04L 63/1433* (2013.01); *H04L 63/083* (2013.01); *H04L 63/0807* (2013.01)

(58) Field of Classification Search
CPC .................................................... H04L 63/20
See application file for complete search history.

(56) References Cited

U.S. PATENT DOCUMENTS 6,418,466 B1    7/2002    Bertram et al.
7,356,840 B1 *  4/2008    Bedell .............. G06F 17/30528
                                                              726/1

(Continued)

FOREIGN PATENT DOCUMENTS

WO    WO 2008/007085    1/2008
WO    WO 2008/070805    6/2008

OTHER PUBLICATIONS

Applicant-Initiated Interview Summary Dated Feb. 1, 2016 From the US Patent and Trademark Office Re. U.S. Appl. No. 14/825,226.

(Continued)

*Primary Examiner* — Hadi Armouche
*Assistant Examiner* — Ali Shayanfar

(57) ABSTRACT

Methods and systems are disclosed for identifying security risks, arising from credentials existing on machines in the networks that enable access to other machines on the networks. Account credentials indications are retrieved from machines in the network, which indicate that credentials for accounts are stored on those machines. Access rights for accounts are collected, describing the access and operation permissions of these accounts on machines in the networks. A correlation is then performed to identify machines that can be accessed by employing credentials of accounts retrieved from other machines in the network.

25 Claims, 4 Drawing Sheets

(56) References Cited

U.S. PATENT DOCUMENTS

| | | | |
|---|---|---|---|
| 7,685,206 B1* | 3/2010 | Mathew | H04L 63/105 707/785 |
| 8,762,357 B2* | 6/2014 | Hu | G06Q 40/02 707/705 |
| 9,313,196 B2* | 4/2016 | Pritchard, Jr. | H04L 63/0815 |
| 9,374,369 B2* | 6/2016 | Mahaffey | H04L 63/0853 |
| 2003/0120603 A1* | 6/2003 | Kojima | G06F 9/468 705/54 |
| 2005/0187894 A1 | 8/2005 | Pletcher et al. | |
| 2006/0195816 A1* | 8/2006 | Grandcolas | G06Q 40/02 717/101 |
| 2006/0206925 A1 | 9/2006 | Dillaway et al. | |
| 2007/0078720 A1* | 4/2007 | Ravikumar | G06Q 20/20 705/25 |
| 2007/0209080 A1 | 9/2007 | Ture et al. | |
| 2007/0250920 A1* | 10/2007 | Lindsay | G06F 21/31 726/7 |
| 2008/0092068 A1 | 4/2008 | Norring et al. | |
| 2008/0120309 A1 | 5/2008 | Copeland et al. | |
| 2009/0235359 A1 | 9/2009 | Abdulhayoglu et al. | |
| 2009/0249440 A1 | 10/2009 | Platt et al. | |
| 2010/0071038 A1 | 3/2010 | Flynn et al. | |
| 2010/0192195 A1 | 7/2010 | Dunagan et al. | |
| 2011/0276700 A1* | 11/2011 | Chaturvedi | H04L 12/2858 709/227 |
| 2012/0075346 A1* | 3/2012 | Malladi | H04N 19/46 345/660 |
| 2012/0110670 A1 | 5/2012 | Mont et al. | |
| 2012/0158787 A1 | 6/2012 | Hu et al. | |
| 2012/0204032 A1* | 8/2012 | Wilkins | H04L 9/006 713/170 |
| 2013/0086380 A1 | 4/2013 | Krishnaswamy et al. | |
| 2013/0319060 A1* | 12/2013 | Niehues | C05C 9/00 71/28 |
| 2014/0032759 A1 | 1/2014 | Barton et al. | |
| 2014/0075567 A1* | 3/2014 | Raleigh | H04W 12/10 726/26 |
| 2014/0101434 A1* | 4/2014 | Senthurpandi | G06F 21/32 713/150 |
| 2014/0164776 A1* | 6/2014 | Hook | H04L 9/14 713/171 |
| 2015/0150125 A1 | 5/2015 | Dulkin et al. | |
| 2015/0350238 A1 | 12/2015 | Dulkin et al. | |

OTHER PUBLICATIONS

Applicant-Initiated Interview Summary Dated May 28, 2015 From the US Patent and Trademark Office Re. U.S. Appl. No. 14/092,991.

European Search Report and the European Search Opinion Dated May 20, 2015 From the European Patent Office Re. Application No. 1495117.8.

Official Action Dated Jan. 6, 2015 From the US Patent and Trademark Office Re. U.S. Appl. No. 14/092,991.

Official Action Dated Sep. 29, 2015 From the US Patent and Trademark Office Re. U.S. Appl. No. 14/825,226.

CyberArk "Discovery & Audit", CyberArk DNA, Product Description Brochure, Cyber-Ark Software Company, 2 P., Nov. 2013.

Dunagan et al. "Heat-Ray: Combating Identity Snowball Attacks Using Machine Learning, Combinatorial Optimization and Attack Graphs", Proceedings of the ACM SIGOPS 22nd Symposium on Operating Systems Principles, SOSP '09, p. 305-320, 2009.

Ghosh et al. "Software Security and Privacy Risks in Mobile E-Commerce. Examining the Risks in Wireless Computing That Will Likely Influence the Emerging E-Commerce Market", Communications of the ACM, 44(2): 51-57, Feb. 2001.

Jungles et al. "Mitigating Pass-the-Hash (PtH) Attacks and Other Credential Theft Techniques. Mitigating the Risk of Lateral Movement and Privilege Escalation", TwC Next, Microsoft Corporation, p. 1-72, 2012.

National Security Agency "Spotting the Adversary With Windows Event Log Monitoring", National Security Agency/Central Security Service, Information Assurance Directorate of the United States of America, p. 1-67, Feb. 28, 2013.

Sommer et al. "Outside the Closed World: On Using Machine Learning for Network Intrusion Detection", IEEE Symposium on Security and Privacy, p. 305-316, May 2010.

SSH Communications Security "Identity and Access Management for Secure Shell Infrastructure", Dara Sheet Universal SSh Key Manager, 4 P., Aug. 31, 2013.

\* cited by examiner

CORRELATION BASED SECURITY RISK IDENTIFICATION

RELATED APPLICATION

This application is a continuation of U.S. patent application Ser. No. 14/825,226, filed on Aug. 13, 2015, which is a continuation of U.S. patent application Ser. No. 14/092,991 filed on Nov. 28, 2013, now U.S. Pat. No. 9,185,136. The contents of the above applications are all incorporated by reference as if fully set forth herein in their entirety.

BACKGROUND

The present invention, in some embodiments thereof, relates to computer security and, more specifically, but not exclusively, to methods and systems of identifying security risks.

Authentication is the process of verifying the identity of a person or application. Authentication in computer systems can be done in various ways and involves acquiring account (user or application) characteristics or credentials and verifying them against a known value. Such credentials can be passwords, but also tokens, biometric characteristics and other values. Various systems of authentication exist, which employ various modes of authentication. In Windows-based networks, authentication is usually performed based on a combination of account and password (other means are also possible, such as biometrics or tokens). The three leading authentication schemes available in Windows-based networks are LAN Manager (LM), NTLM and Kerberos. In LM and NTLM, after successful authentication at an endpoint, hash values (results of computation of hash function on the password) are used to authenticate the account to other network resources. In Kerberos, tickets are used instead of hashes to authenticate the account to network resources.

Therefore, it is clear that potentially many credentials (such as passwords, hashes and tokens) exist on a machine that can serve to authenticate to network resources. Thus, there exists a risk that a malicious actor that takes control over a machine can use the credentials that exist on that machine to access other machines.

In computer security, Pass-the-Hash is a hacking technique that enables an attacker to authenticate to a resource, such as a remote server/service by using the underlying NT local area network (LAN) manager (NTLM) and/or LanMan hash of an account password, instead of requiring the associated plaintext password (or other credentials), which is normally needed for authentication. Similarly, Pass-the-Ticket is a hacking technique that enables authentication by using the Kerberos tickets associated with an account, without requiring the associated password.

In Pass-the-Hash, after an attacker obtains a valid account name and account password hashes values (which can be done using various methods and tools), he or she is then able to use that information to authenticate to a remote server/service using LAN manager (LM) or NTLM authentication without the need to brute-force the hashes to obtain the cleartext password. The attack exploits a design flaw in the authentication protocol in that the password hashes are used for authentication to network resources, thus becoming an effective equivalent to passwords.

This technique can be performed against any server/service accepting LM or NTLM authentication, whether it is running on a machine with Windows, Unix, or any other operating system. A related technique, Pass-the-Ticket, can be used to the same effect in network employing the Kerberos authentication scheme.

SUMMARY

According to an aspect of some embodiments of the present invention there is provided a method of determining security risks. The method comprises retrieving a plurality of account credentials indications stored on a plurality of members of a first group of machines in a network, collecting a plurality of account access rights, each one of the plurality of account access rights grants an access to at least one member of a second group machines in the network, and identifying at least one of a presence and absence of a plurality of security risks to at least one member of the second group by a correlation between at least one of the plurality of account credentials indications and at least one of the plurality of account access right. The at least one account credentials indication and the at least one account access right is of the same account.

Optionally, the plurality of account credentials indications are a plurality of indications of existence of password hash values in the storage of at least one member of the first group.

Optionally, the plurality of account credentials indications are a plurality of indications of existence of Kerberos tickets in the storage of at least one member of the first group.

Optionally, the method further comprises generating a mapping dataset which maps the plurality of account credentials indications to machines in the first group; wherein the identification is performed by an analysis of the mapping dataset.

More optionally, the generating comprises determining an invalidity of account credentials indications in at least one of machines in the first group and filtering data from the mapping dataset accordingly.

Optionally, the retrieving comprises separately querying each of the plurality of machines for account credentials indications stored in a respective storage.

Optionally, the retrieving comprises receiving the plurality of account credentials indications from a plurality of local agents installed on machines in the first group of machines.

Optionally, the retrieving comprises querying an event log of each of machines in the first group of machines.

Optionally, the identifying comprises discovering accounts, such that the account credentials indications are retrieved from machines of the first group and the account credentials indications are indicative of a plurality of accounts having account access rights to machines in the second group.

Optionally, the network is a private network.

Optionally, the method further comprises acquiring a list describing machines of the first group, the list is generated by at least one of: querying a central repository, probing a plurality of machines on the network, scanning a plurality of Internet Protocol (IP) addresses, receiving the list from a human operator, and receiving the list from a software module.

Optionally, the method further comprises reporting the identified security risks.

According to an aspect of some embodiments of the present invention there is provided a system of determining at least one security risk. The system comprises a processor, an account credentials indications module which retrieves a plurality of account credentials indications stored on a plurality of members of a first group of machines in a network, an account access rights module which collects a plurality of account access rights, each one of the plurality of account access rights grants an access to at least one member of a second group machines in the network, and a correlation module which identifies at least one of a presence and absence of a plurality of security risks to at least one member of the second group by a correlation between at least one of the plurality of account credentials indications and at least one of the plurality of account access right. At least one account credentials indication and the at least one account access right is of the same account.

Optionally, the plurality of account credentials indications are a plurality of indications of existence of password hash values in the storage of at least one member of the first group.

Optionally, the plurality of account credentials indications are a plurality of indications of existence of Kerberos tickets in the storage of at least one member of the first group.

Optionally, the correlation module generates a mapping dataset which maps the plurality of account credentials indications to machines in the first group; wherein the identification is performed by an analysis of the mapping dataset.

More optionally, the correlation module determines an invalidity of account credentials indications in at least one of machines in the first group and filtering data from the mapping dataset accordingly.

Optionally, the account credentials indications module separately queries each of the plurality of machines for account credentials indications stored in a respective storage.

Optionally, the account credentials indications module receives the plurality of account credentials indications from a plurality of local agents installed on machines in the first group of machines.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 3 is an exemplary list generated according to some embodiments of the present invention to indicate to which group each of a plurality of accounts belongs;

FIG. 4 is an exemplary report generated according to some embodiments of the present invention.

DETAILED DESCRIPTION

Figure 1:
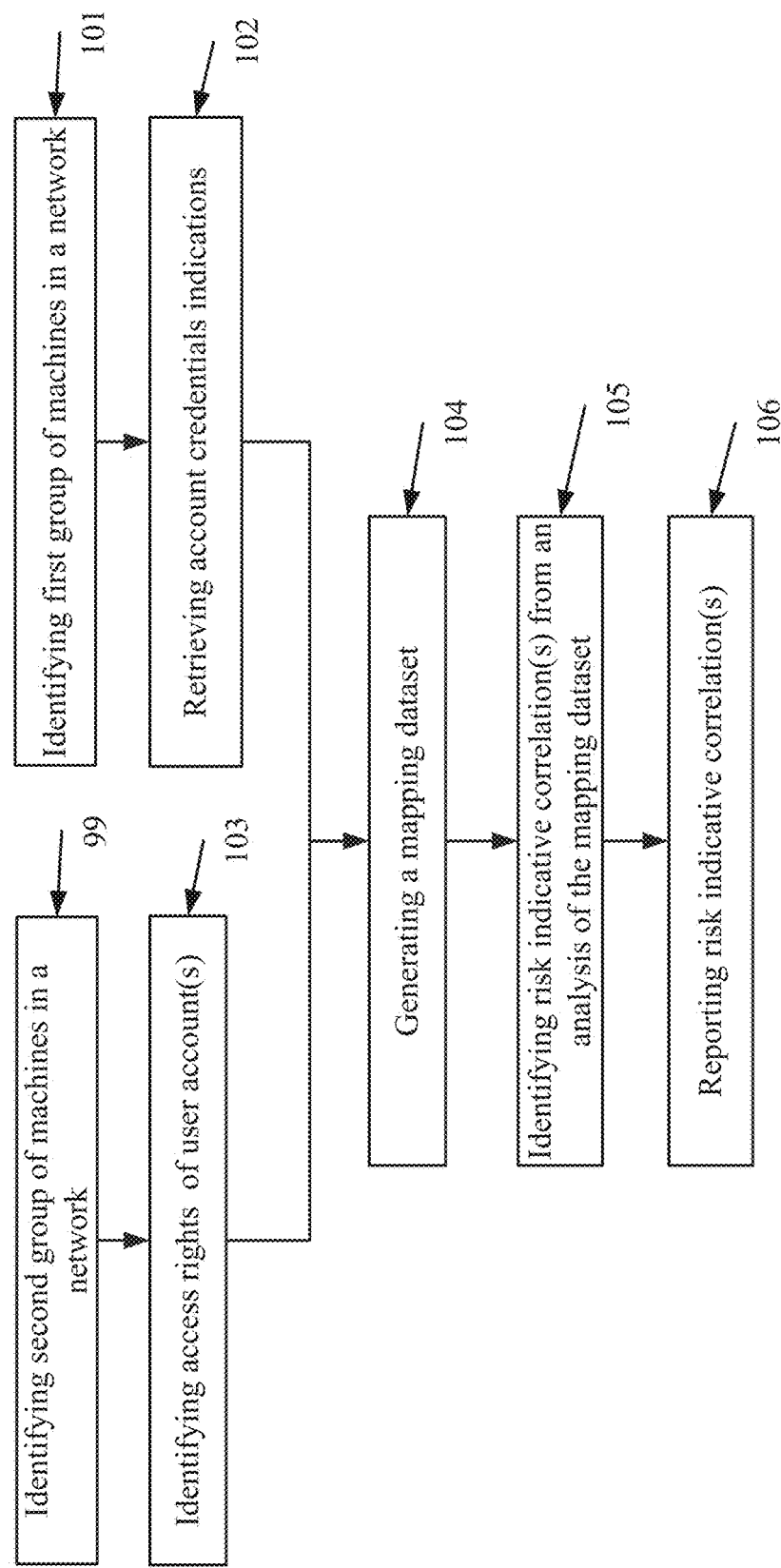
FIG. 1 is a flowchart of a method of identifying security risks of machines (e.g. computers) in a network by retrieving account credentials indications on machines in the network and correlating them with account access rights, according to some embodiments of the present invention.

The present invention, in some embodiments thereof, relates to computer security and, more specifically, but not exclusively, to methods and systems of identifying security risks.

According to some embodiments of the present invention, there are provided methods and systems of determining one or more security risks to a target machine in a network, such as a private network, by identifying existence of credentials on a specific machine that can enable access to other machines of the network.

The methods and systems are optionally based on retrieving account credentials indications stored in machines of a network, for example by separately querying each one of the machines for the account credentials indications that exist in a storage on a specific machine (e.g. persistent and/or non-persistent storage).

Additionally, account access rights to machines in the network are retrieved, for example by querying the machines. Another option is to query a central repository of account access rights, such as the domain controller, regarding the account access rights to machines in the network.

An analysis is then performed to discover correlations between found account credentials indications and discovered account access rights, such correlations indicative of potential security risks. The correlations are of a sort "on machine X there are credentials for account Y which has account access rights to machine Z". The potential risk is the risk to machine Z from the possibility that an attacker who takes control over machine X and retrieves the credentials for account Y, can use them to access machine Z. The analysis may also indicate which risks existed in the past and no longer exist. For example, when account credentials indications are collected that indicate that at some point in the past there were credentials existing on a machine, it is possible to correlate and deduce that at that time there was present a security risk to another machine.

Optionally, the correlations indicative of security risks are direct correlations, for example between a first machine storing authentication credentials for an account, which facilitate access to a second machine, and the second machine. Additionally or alternatively, correlations are indirect for example between a first machine storing authentication credentials for an account, which facilitate access to a second machine, that stores authentication credentials for an account which facilitates access to a third machine (and/or to other machines that store the authentication credentials for an account which facilitate access to the third machine) and the third machine. An indirect correlation may be mapped in a vector describing a possible path of access to a number of machines using authentication credentials which are taken sequentially from the machines, by which a malicious actor (such as a hacker) may gain access to a target machine.

Account credentials indications may be retrieved by querying machines remotely or by using local agents which are installed in the machine. The querying can be directly for the credentials (checking the existence of credentials and/or retrieving credentials) or for log records that indicate use of credentials on the machine, from which it is possible to deduce that the credentials exist on the machine. The local agents can be persistent or volatile, and be either pre-installed or installed on demand. The querying can be done by established network protocols and services, such as WMI (Windows Management Instrumentation) interfaces.

Machines on the network may be discovered by retrieving information from a domain controller, such as Active Directory, by crawling IP (Internet Protocol) addresses, by retrieving information from configuration management database (CMDB), by querying Lightweight Directory Access Protocol (LDAP) repositories and by other means. A list of machines in the network may be compiled, based on which machines in the network are queried for account credentials indications. The list, or a similar list, may serve to collect information on account access rights to machines in the network. It is also possible to have the list prepared manually or pre-delivered, without the need to build it.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart of method 100 of identifying security risks of machines (e.g. computers) in a monitored network by correlating between account credentials indications for accounts and the account access rights to machines in the network. The method allows mapping security risks in network based on an analysis of a distribution of account credentials indications among machines and data indicative of the account access rights associated with the discovered account credentials. For example, Pass-the-hash risk may be mapped by identifying the storage of account credentials indications such as existence of password hashes in different machines and by correlating this information with data about account access rights which are associated with these account credentials. Account credentials, for brevity referred to as credentials, may be passwords, tokens, tickets, password hashes, biometrics and/or any means of authentication for an account. For example, in Windows networks, password hashes serve as credentials to gain access to network resources and therefore are effectively equivalent to passwords. In the context of this document, credentials also include Kerberos tickets. Credentials are used to authenticate an account. In the context of this document, credentials include cracked hashes, as malicious actors who retrieved hashes can crack them and use cracked hashes as credentials.

Account access rights may be access rights of an account to access or use a network resource, for example access and operation rights, a set of permissions of an account for the specific machine and/or the like.

Machine, also referred to as a network resource may be one or more servers, one or more computers, one or more computer systems, one or more computer devices, one or more mobile devices, one or more network devices, one or more databases, one or more computer components, one or more computer modules, one or more engines, one or more software modules, and/or one or more applications. On machines there are defined accounts with account access rights. For instance machines are machines which verify and authenticate credentials of an account before providing the account with access and/or the ability to perform operations.

Account credentials indications may be any recorded or logged indication of credentials existence on a machine. Account credentials indications may be queried locally or remotely for example as described below. Account credentials indications may serve as a basis for deducing that credentials for an account are present on the machine. Such an indication may be a verified existence of credentials on a machine, which refers to an actual credential (password, hash etc. as described above) existing on the machine. This information can be retrieved, for example, by accessing the registry, SAM, Local Security Authority Subsystem Service (LSASS), memory, persistent and non-persistent storage of the machine. Such an indication may also be an access log record, which is indicative of an account successfully logged-on to the machine. For example, in Windows networks authentication, specific types of user logons create and leave credentials (for example hashes) on the machine, thus it is possible to deduce from the existence of "successful logon" record that there are credentials for that account on the machine. By querying the access logs of the machine to see whether the machine has been accessed, how when it has been accessed and by which account, deducing which credentials for specific accounts are currently exist on the specific machine, for example as described below. For brevity, the term account includes a local or network/domain account which is used by one or more human users, applications, devices and/or other entities to gain access and operation rights, referred to herein as account access rights, on a network resource.

The method allows, for example, identifying security risks that facilitate Pass-the-Hash, Pass-the-ticket, and/or other credential exploitation attacks wherein an attacker retrieves credentials from one machine and then uses those captured credentials to authenticate to other machines over the network. The security risk may be any risk to a specific machine that is an outcome of the possibility that an attacker who takes control over one or more other machines may be able to retrieve account credentials for an account having account access rights to the specific machine.

Figure 2:
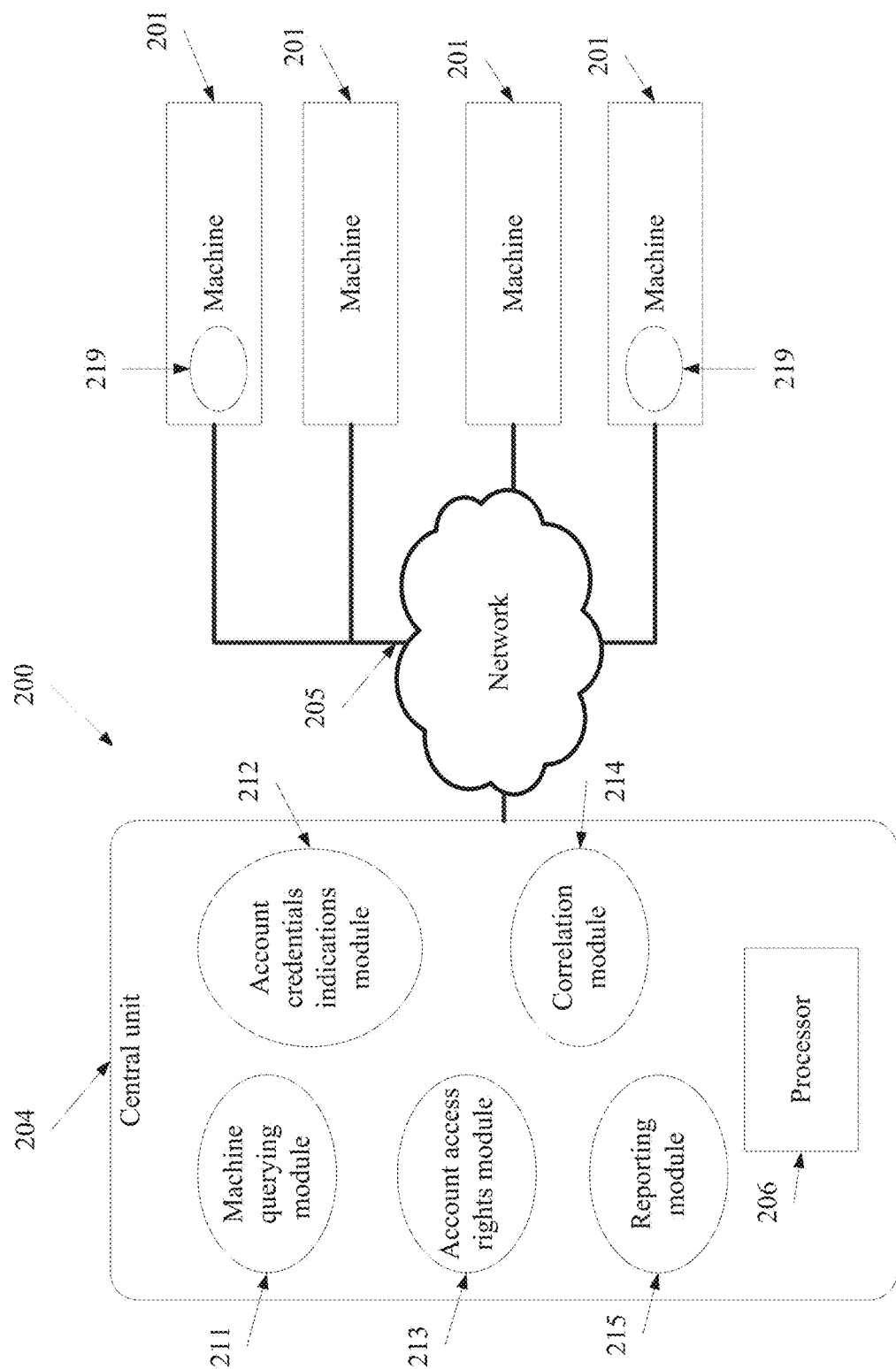
FIG. 2 is a schematic illustration of a security system for identifying security risks in one or more machines which are connected to a network, according to some embodiments of the present invention.

Reference is also made to FIG. 2, which is a schematic illustration of a security system 200 of identifying security risks in one or more machines 201 which are connected to a network 205 such as a LAN or a private network, such as a virtual private network (VPN), an organizational network, and/or any network of machine which are accessible through authentication of account credentials, according to some embodiments of the present invention. The security system 200 optionally includes a central unit 204 implemented by one or more network nodes with one or more processor(s) 206, such as servers. The central unit 204 executes one or more modules, for example a machine querying module 211, an account credentials indications module 212, an account access rights module 213, a risk indicative correlation module 214, and/or a reporting module 215, for example as described below, for instance using the processor(s) 206 for execution.

Optionally, as shown at 101, machines 201 in a target network such as 205, for example a LAN or a PN, are identified.

Now, as shown at 102, a plurality of account credentials indications from machines 201 of the network 205 is retrieved, optionally by separately querying each machine 201, for example using an account credentials indications module 212.

The account credentials indications may be retrieved from the persistent storage of one or more of the machines 201, for example from the registry and/or the SAM repository. The account credentials indications may be retrieved from the non persistent storage of one or more of the machines 201, for example extracted from the Local Security Authority Subsystem Service (LSASS) process. The account credentials indications may be retrieved by querying the Events log of a machine, for access records indicative of credentials residing on machine.

Optionally, the list of machines is used for retrieving the account credentials indications for each machine 201. Optionally, Windows management instrumentation (WMI) is used to query each machine for the account credentials indications on the queried machine 201. Optionally, a local agent 219 in some or all of the machines 201 gathers the respective account credentials indications and forwards the gathered information to the account credentials indications module 212 via the network 205. A local agent may be a software component such as an application, an add-on and/or a code script. The local agent may be installed in advance or installed on demand, and be either persistent (i.e. remain on the machine for future information collections) or volatile (i.e. deleted after information collection is complete). Optionally, an event log, such as a Windows event log, in each machine is analyzed, either locally by an agent and/or by a querying module, to discover account credentials indications in the respective machine, for example, by examining which accounts accessed the machine in the past, at what time and in what way. For instance, logon records indicative of probable presence of a password hash value or Ticket Granting Ticket (TGT) on the respective machine in the Windows event log may be retrieved through a WMI query. These logon records allow deducing which password hash values and/or tickets potentially exist in the machine, existed in the machine in the past on this machine due to account logons and/or no longer exist in the machine due to a restart, an account logoff and/or any other terminating event.

As shown at 103, account access rights of some or all of the accounts are identified, for example using an account access rights querying module 213, optionally by querying members of a group of machines which are connected to the network 205, for instance as shown at 99. Account access rights data may be retrieved from a Windows machine in the network using WMI, for instance by querying the machine remotely, or by using local agent 219 installed in the machine and reports the account access rights data to the central unit 204, or deduced from Windows event logs (for example, by examining which accounts connected in the past).

Figures 3, 4:
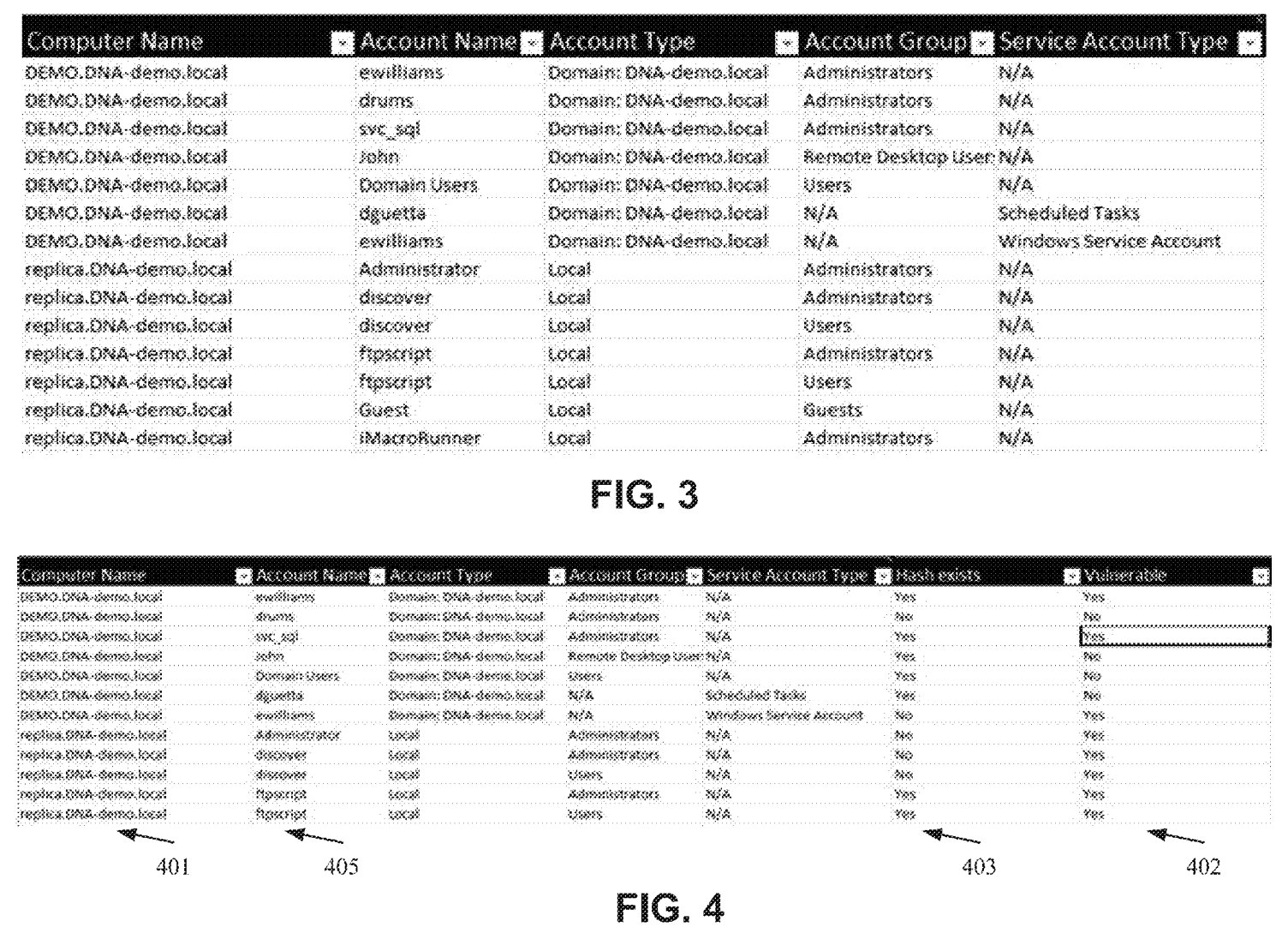

Account access rights may be granted to specific accounts, or through a group definition, of which the account is member of. For instance, members of the Administrators account group on a certain machine have administrative rights on that machine. Optionally, nested groups are identified to extract account data of any accounts with account access rights to the machine. Optionally, in this sub process, a list summarizing to which group each account belongs is generated and optionally a reference to dataset indicative of permissions granted for each account (or group). For example, FIG. 3 depicts such a list.

As shown at 104, a mapping dataset that maps in which of the plurality of machines account credentials indications were discovered and for which accounts is created based on 102. The dataset mapping may be created by a risk indicative correlation module 214. The mapping dataset may be any type of data element, such as a list, a table, a map, a vector, matrix and/or the like.

Optionally, mapping dataset is filtered to avoid redundant false positive indications about the storage of authentication credentials values in machines. For example, indication(s) of a presence of password hash values in machines executing password hash value deletion scenarios such as a log off scenario or a restart scenario held lately, for example within the last few minutes or any other defined period, are deleted from the mapping dataset. Optionally, invalid credentials indications are filtered, for example when deducing that credentials were stored on a machine in the past, but is no longer stored. For example, a combination of an indication of access with credentials documented in an event log that logs which credentials of accounts used to access the machine with an indication of an event such as "logoff" or "restart" which deletes credentials from the machine may be indicative of an invalid credentials indication. Such indication should not serve as a basis for identifying a current security risk in the network; however, may serve to indicate previously existing security risk.

This mapping dataset allows, together with information about the access right(s) of each account, as shown at 105, to identify risk indicative correlation(s) between one or more machines on which reside credentials for an account that has account access rights to a certain machine and the certain machine. A risk indicative correlation may be any correlation between a machine storing account credentials of an account having account access rights to one or more other machines.

These risk indicative correlation(s) are indicative of security risks, for example as defined above and herein. A risk indicative correlation may be between a first machine that stores credentials for accounts with account access rights to a second machine and the second machine. The association to the account access rights may be derived from the data acquired in 103. At 105, it is also possible to identify a risk indicative correlation between a series of machines where one machine in the series stores credentials for account with account access rights to one or more other machine(s) in the series, which store credentials for account with account access rights to a further another machine in the series. This series may be described by an attack vector which describes an ordered sequence of attacks based on existing risks. Such risk indicative correlation may be at any tier of connections, for example between a machine that stores a first authentication credentials to another machine that stores a second authentication credentials to a further another machine that stores a third authentication credentials to a different machine and so one and so forth. These security risks may include a risk to a Pass-the-Hash attack, Pass-the-Ticket attack and/or any credential reuse attack.

Optionally, as shown at 106, a report mapping the identified risk correlations, for brevity also referred to herein as security risks, is generated. For example, FIG. 4 depicts a table showing machines 401, accounts on machines 405, indication of credentials (for example, password hash values 403), and the risk status 402. The reports may indicate on which machines credentials for which accounts are stored and indicate which machines are vulnerable as a result of the identified risk indicative correlation(s).

Figure 5:
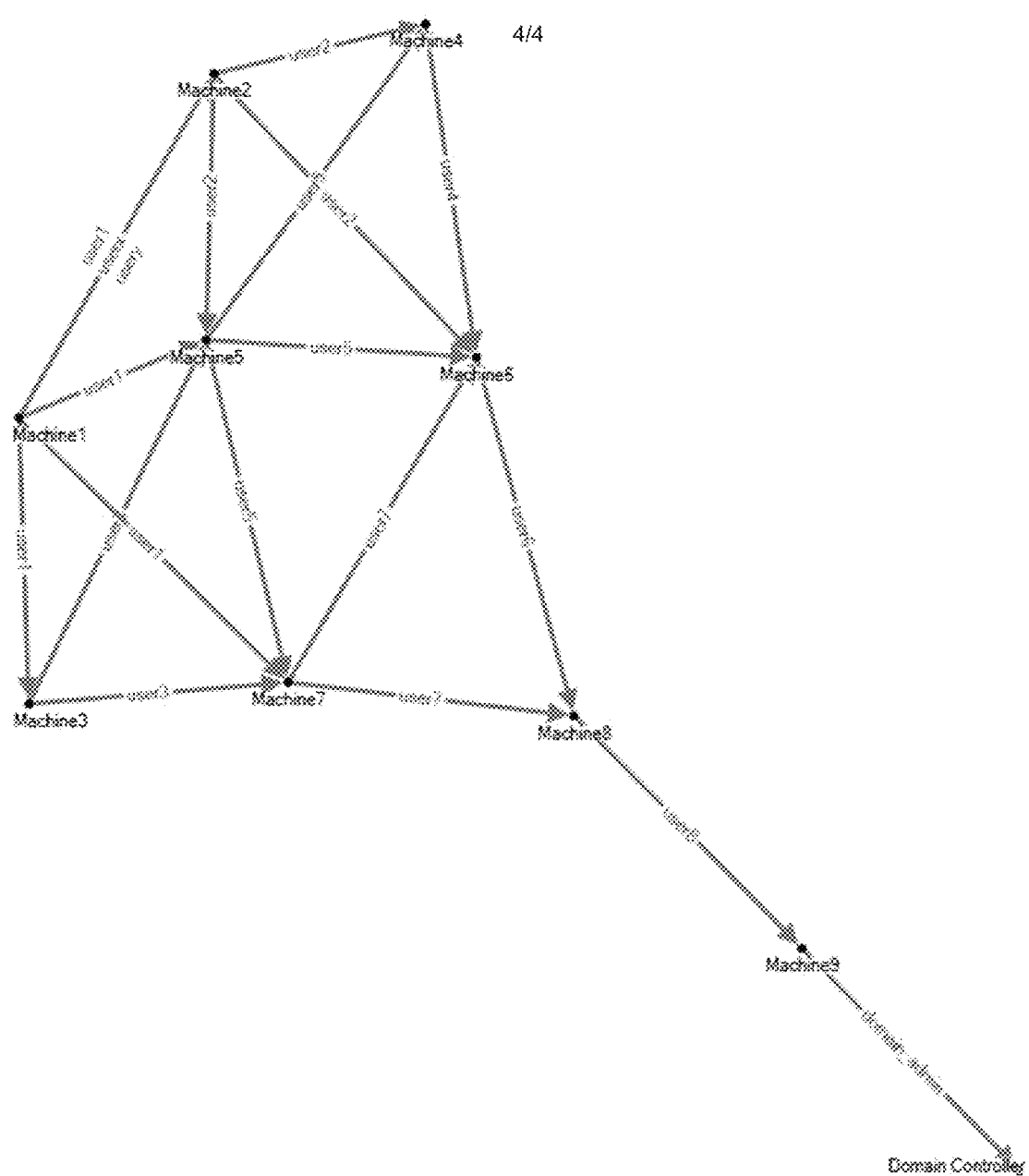
FIG. 5 is a report graph generated according to some embodiments of the present invention.

Optionally, the report includes an indication of the risk indicative correlation between machines, drawing potentials attack routes with indications of credentials and machines vulnerable to potentials attacks. For example, a graph wherein nodes are machines and edges are risk indicative correlations between machines may be generated to depict how credentials on machines in the networks introduce security risk to machines in the network. Each edge indicates a potential to use credentials residing on one machine (source node from which an edge is originated) to access another machine (target node to which an edge is connected). For example, see FIG. 5 which is exemplary graph mapping security risk and risk indicative correlations between machines.

EXAMPLES

Scenario 1—an NTLM hash of a password of a domain account net_admin is stored in the LSASS process on machine MACH_1, for example due to a previous activity performed by net_admin on MACH_1, such as installing system updates, which was performed by remote desktop protocol (RDP), a connection method that is known to leave hashes on target machines in the memory of the LSASS process. If an attacker gains control of MACH_1 by any means, they will be able to retrieve the hash and use it to gain access to other machines in the network for which net_admin has account access rights. Current invention can detect an indication of credential—for example, by analyzing the event log of MACH_1, it is possible to find that net_admin connected to MACH_1 by RDP, thus, the hash for net_admin is present on MACH_1. In parallel, account access rights are collected from machines in the network, and it is learned that net_admin has account access rights on MACH_2 and MACH_3. A correlation is found and a risk is identified—the risk is that MACH_1, which is stored credentials for net_admin account, creates risk for MACH_2 and MACH_3, on which net_admin has account access rights.

Scenario 2—an LM hash for local account loc_user is stored in the SAM of MACH_4. As is custom in many organizations, machines are installed by IT stuff from "images", which are predefined configurations. Same account loc_user is also defined on MACH_5. The passwords for these local accounts are the same, as both machines are created from the same image. Current invention will discover through local agents on MACH_4 and MACH_5 account credentials indications—the existence of LM hashes for local accounts loc_user. It will also collect information that loc_user accounts have account access rights on MACH_4 and MACH_5. A correlation is found and two risks are identified—MACH_4 has credentials for loc_user, which can be used to access MACH_5 and MACH_5 has credentials for loc_user, which can be used to access MACH_4.

Scenario 3—a query of the event log on MACH_6 shows that domain user dom_user accessed MACH_6 by RDP, which is known to leave hashes on target machine in the LSASS process memory. Additionally, the query result shows that three hours after the logon operation, there was a restart of MACH_6. A restart is known to delete the hashes from the LSASS process memory, thus there are no longer valid account credentials indications for account dom_user on MACH_6. Collection of account access rights shows the dom_user has account access rights on MACH_7. A correlation is found, which shows that while currently MACH_7 is not at risk from MACH_6 due to account dom_user, there was a time period of 3 hours in the past during which such risk existed.

Scenario 4—an indication of credential for account d_user is found on MACH_8. An indication of credential for account "d_admin" is found on MACH_9. Account access rights for d_user are found on MACH_9 and for "d_admin" on MACH_10. A risk is discovered, which shows that an attacker who takes control over MACH_8 can use credentials for d_user to access MACH_9, then take credentials "d_admin" to access MACH_10.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant methods and systems will be developed and the scope of the term a module, a network, and a system is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method for identifying security risks, comprising:
    using at least one computer system having a processor and connected to a computer network to perform the following actions:
    retrieving a plurality of account credentials of a plurality of accounts from a storage of each member of a first group of machines in said computer network, said storage comprising at least one member of a group consisting of a registry, a Security Account Manager (SAM), a Local Security Authority Subsystem Service (LSASS), a memory, a persistent storage and a non-persistent storage;
    collecting a plurality of account access rights, each one of said plurality of account access rights grants to one of said plurality of accounts an access to at least one member of a second group of machines in said computer network;
    identifying correlated account credentials from said plurality of account credentials, wherein said correlated account credentials are for an account of said plurality of accounts that is granted access to a certain machine of said second group of machines according to at least one account access right of said collected plurality of account access rights
    using said correlated account credentials to request access to said certain machine, and
    identifying automatically at least one security risk according to an outcome of said request;
    wherein said certain machine is from said second group of machines, said correlated account credentials is from said plurality of retrieved account credentials, said certain account is from said plurality of accounts, and said correlated account access rights is from said plurality of account access rights.

2. The computer-implemented method of claim 1, further comprising identifying said certain machine of said second group according to a correlation between at least one account credential of a certain account retrieved from a machine of said first group and account access rights collected for of said certain account on said machine of said second group.

3. The computer-implemented method of claim 1, wherein said identifying at least one security risk is based on said account access rights collected for said account on said certain identified machine.

4. The computer-implemented method of claim 1, wherein said security risk identification is performed at any tier of connection with the certain identified machine.

5. The computer-implemented method of claim 1, further comprising identifying said certain machine of said second group according to a correlation between at least one account credential of a certain account retrieved from a machine of said first group and account access rights collected for of said certain account on said machine of said second group.

6. The computer-implemented method of claim 1, wherein each of said plurality of account credentials is a member of a group consisting of: a password, a password hash, a Kerberos ticket and a token.

7. The computer-implemented method of claim 1, further comprising determining an invalidity of account credentials in at least one of machines in said first group and filtering said invalidated account credentials accordingly.

8. The computer-implemented method of claim 1, wherein said retrieving comprises separately querying each of said first group of machines for account credentials stored in a respective storage.

9. The computer-implemented method of claim 1, wherein said retrieving comprises communicating with a plurality of local agents installed on machines in said first group of machines to enable said plurality of local agents to retrieve said plurality of account credentials.

10. The computer-implemented method of claim 1, further comprising acquiring a list describing machines of said first group, said list is generated by at least one of:
    querying a central repository;
    probing a plurality of machines on said computer network;
    scanning a plurality of Internet Protocol (IP) addresses;
    receiving said list from a human operator; and
    receiving said list from a software module.

11. The computer-implemented method of claim 1, further comprising reporting said at least one identified security risk.

12. A non-transitory computer readable medium including instructions that, when executed by at least one processor, cause the at least one processor to perform security risk identification operations in a network, comprising:
    retrieving a plurality of account credentials of a plurality of accounts from a storage of each member of a first group of machines in said computer network, said storage comprising at least one member of a group consisting of a registry, a Security Account Manager (SAM), a Local Security Authority Subsystem Service (LSASS), a memory, a persistent storage and a non-persistent storage;
    collecting a plurality of account access rights, each one of said plurality of account access rights grants to one of said plurality of accounts an access to at least one member of a second group of machines in said computer network;
    identifying correlated account credentials from said plurality of account credentials, wherein said correlated account credentials are for an account of said plurality of accounts that is granted access to a certain machine of said second group of machines according to at least one account access right of said collected plurality of account access rights using said correlated account credentials to request access to said certain machine, and identifying automatically at least one security risk according to an outcome of said request;

wherein said certain machine is from said second group of machines, said correlated account credentials is from said plurality of retrieved account credentials, said certain account is from said plurality of accounts, and said correlated account access rights is from said plurality of account access rights.

13. The non-transitory computer readable medium of claim 12, wherein said instruction include identifying said certain machine of said second group according to a correlation between at least one account credential of a certain account retrieved from a machine of said first group and account access rights collected for of said certain account on said machine of said second group.

14. The non-transitory computer readable medium of claim 12, wherein said instructions include communicating with a server in the computer network to enable said server to retrieve said plurality of account credentials.

15. The non-transitory computer readable medium of claim 12, wherein said security risk identification is performed at any tier of connection with the certain identified machine.

16. The non-transitory computer readable medium of claim 12, wherein said security risk identification is further based on said account access rights collected for said account on said certain identified machine.

17. The transitory computer readable medium of claim 12, wherein each of said plurality of account credentials is a member of a group consisting of: a password, a password hash, a Kerberos ticket and a token.

18. The transitory computer readable medium of claim 15, further comprising determining an invalidity of account credentials in at least one of machines in said first group and filtering said invalidated account credentials accordingly.

19. The transitory computer readable medium of claim 15, wherein said account credentials retrieval comprises separately querying each of said first group of machines for account credentials stored in a respective storage.

20. The transitory computer readable medium of claim 15, wherein said instructions include communicating with a plurality of local agents installed on machines in said first group of machines to enable said plurality of local agents to retrieve said plurality of account credentials.

21. A system of identifying at least one security risk, comprising:
at least one hardware processor;
a program store storing code
wherein said at least one hardware processor is coupled to the program store for executing the stored code, the code comprising:
code to retrieve a plurality of account credentials of a plurality of accounts from a storage of each member of a first group of machines in a computer network, said storage comprising at least one member of a group consisting of a registry, a Security Account Manager (SAM), a Local Security Authority Subsystem Service (LSASS), a memory, a persistent storage and a non-persistent storage;
code to collect a plurality of account access rights, each one of said plurality of account access rights grants to one of said plurality of accounts an access to at least one member of a second group of machines in said computer network;
code to identify correlated account credentials from said plurality of account credentials, wherein said correlated account credentials are for an account of said plurality of accounts that is granted access to a certain machine of said second group of machines according to at least one account access right of said collected plurality of account access rights;
code to use said correlated account credentials to request access to said certain machine;
code to identify automatically at least one security risk according to an outcome of said request;
wherein said certain machine is from said second group of machines, said correlated account credentials is from said plurality of retrieved account credentials, said certain account is from said plurality of accounts, and said correlated account access rights is from said plurality of account access rights.

22. The system of claim 21, wherein each of said plurality of account credentials is a member of a group consisting of a password, a password hash, a Kerberos ticket and a token.

23. The system of claim 21, wherein said at least one hardware processor implements the stored code to determine an invalidity of account credentials in at least one of machines in said first group and filtering said plurality of account credentials accordingly.

24. The system of claim 21, wherein said at least one hardware processor implements the stored code to query separately each of said first group of machines for account credentials stored in a respective storage.

25. The system of claim 21, wherein said at least one hardware processor executes the stored code to receive said plurality of account credentials from a plurality of local agents installed on machines in said first group of machines.

* * * * *